Patented Jan. 7, 1941

2,227,504

UNITED STATES PATENT OFFICE 2,227,504

DISAZO DYESTUFFS CAPABLE OF BEING CONVERTED INTO COMPLEX CHROMIUM COMPOUNDS

Hans Krzikalla and Helmut Pfitzner, Ludwigshafen-on-the-Rhine, Germany, assignors to General Aniline & Film Corporation, a corporation of Delaware No Drawing. Application August 31, 1938, Serial No. 227,852. In Germany September 11, 1937

6 Claims. (Cl. 260—147)

The present invention relates to disazo dyestuffs capable of being converted into complex chromium compounds.

We have found that valuable disazo dyestuffs capable of being converted into complex chromium compounds are obtained by coupling tetrazotized 4.4'-diaminodiphenyls with occupied 2 and 2'- positions or tetrazotized 2.4'-diaminodiphenyls with 2 molecular proportions of compounds capable of coupling of which at least one is an aryl pyrazolone in which the aryl radicle contains at least one group capable of forming complex chromium compounds. The resulting dyestuffs may then be treated with agents supplying chromium to form valuable complex chromium compounds.

As 4.4'-diaminodiphenyls of the said kind there may be mentioned for example meta-tolidine, meta-dianisidine, meta-dichlorbenzidine, benzidine-meta-disulphonic acid and ortho-tolidine-meta-disulphonic acid. On the other hand there may be used 2.4'-diaminodiphenyl and its substitution products, such as 5-chlor-2.4'-diaminodiphenyl. As aryl pyrazolones of the type defined there may be mentioned for example ortho-hydroxy-carboxypyhenylpyrazolones, such as 3-methyl-1-(2'- or 4'-hydroxy-3'-carboxy-5'-sulphophenyl)-5-pyrazolone and 3-methyl-1-(4''-hydroxy-5''- carboxy-4'- sulphophenyl-sulphone-2')-5-pyrazolone or the corresponding compounds free from sulphonic groups.

The new dyestuffs may contain 2 radicals of the pyrazolones; they may also contain one pyrazolone radicle and the radicle of another coupling component. In the later case, the tetrazotized diaminodiphenyl is coupled with one molecular proportion of the pyrazolone and one molecular proportion of another coupling component, such as salicylic acid, acetyl-acetone, aceto-acetic acid arylides, pyrazolones which do not contain chromable groups in the phenyl radicle, such as 3-methyl-1-phenyl-5-pyrazolone, or their sulphonic acids, 8-hydroxyquinoline-5-sulphonic acid or 2.6-naphthol sulphonic acid.

It is preferable so to choose the starting materials that the dyestuffs contain at least one or two sulphonic acid groups in the molecule. The chroming of the dyestuffs takes place very readily and may be carried out in the usual way by boiling for a short time or evaporating with an agent supplying chromium, such as chromic salts. Already chromed phenylpyrazolones may also be used as initial materials.

The disazo dyestuffs containing chromium thus obtained are especially suitable for the dyeing of leather. It is dyed in uniform shades of good fastness to alkali and acid and very fast to washing. The dyestuffs are also suitable for dyeing other fibrous materials, as for example silk or paper.

As compared with the dyestuffs containing instead of the chromable pyrazolones other coupling components capable of being chromed, the new dyestuffs show a far better fastness to acids.

The following examples will further illustrate how this invention may be carried out in practice but the invention is not restricted to these examples. The parts are by weight.

Example 1

21 parts of meta-tolidine the tetrazotized and the tetrazo solution is allowed to flow into a solution of 65 parts of 3-methyl-1-(2'-hydroxy-3'-carboxy-5'-sulphophenyl)-5-pyrazolone in an excess of sodium carbonate. The disazo dyestuff is salted out, filtered off by suction and evaporated with a chromium formate solution corresponding to 19 parts of chromic oxide. The dyestuff thus obtained has very good solubility and dyes leather clear yellow shades fast to acid, alkali and washing.

A similar dyestuff is obtained by using 2.2'-dichlobenzidine, benzidine-meta-disulphonic acid or ortho-tolidine-meta-disulphonic acid as the tetrazo compound instead of meta-tolidine or by using 2 molecular proportions of 3-methyl-1-(4''-hydroxy- 3''-carboxy- 4'-sulphodiphenylsulphone-2')-5-pyrazolone or 1 molecular proportion of this pyrazolone and 1 molecular proportion of the abovementioned pyrazoline as compounds capable of coupling.

Example 2

18 parts of 2.4'-diaminodiphenyl are tetrazotized and coupled with 65 parts of 3-methyl-1-(2'-hydroxy-3'- carboxy-5'- sulphophenyl)-5-pyrazolone and chromed as described in Example 1. A similar good dyestuff is obtained which dyes leather yellow shades and which is also very fast to washing and light. The dyestuff also yields dyeings of very good fastness to water on silk.

Example 3

34 parts of benzidine-meta-disulphonic acid are tetrazotized and coupled first with 31.4 parts of 3 - methyl-1-(2'-hydroxy-3'-hydroxy-5'-sulphophenyl)-5-pyrazolone and then with 15 parts of salicylic acid in alkaline solution. The dyestuff is then chromed as described in Example 1.

A yellow dyestuff which yields dyeings fast to washing on leather is obtained.

By using, for example, 1-phenyl-3-methyl-5-pyrazolone, acetoacetic acid anilide, dihydroresorcinol or acetylacetone instead of salicylic acid, similar yellow dyestuffs are obtained.

What we claim is:

1. The complex chromium compounds of disazo dyestuffs corresponding to the general formula

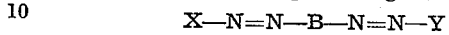

which contain at least one sulphonic acid group wherein B stands for a radicle selected from the class consisting of diphenyls being substituted in 2- and 2'-position with reference to the azo groups shown in 4- and 4'-position and diphenyls attached to the azo groups shown in 2- and 4'-position, and wherein X and Y stand for radicles of coupling components, at least one of which is a phenyl-pyrazolone containing in the phenyl nucleus a grouping capable of forming complexes with chromium.

2. The complex chromium compounds of disazo dyestuffs corresponding to the general formula

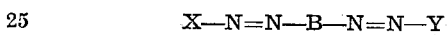

which contain at least one sulphonic acid group wherein B stands for a radicle selected from the class consisting of diphenyls being substituted in 2- and 2'-position with reference to the azo groups shown in 4- and 4'-position and diphenyls attached to the azo groups shown in 2- and 4'-position, and wherein X and Y stand for radicles of coupling components, at least one of which is a 1-(ortho-hydroxy-carboxy-phenyl)-pyrazolone.

3. The complex chromium compounds of disazo dyestuffs corresponding to the general formula

which contain at least one sulphonic acid group, wherein B stands for a radicle selected from the class consisting of diphenyls being substituted in 2- and 2'-position with reference to the azo groups shown in 4- and 4'-position and diphenyls attached to the azo groups shown in 2- and 4'-position, and wherein both X and Y stand for the radicle of a 1-(ortho-hydroxy-carboxyphenyl)-pyrazolone.

4. The complex chromium compounds of disazo dyestuffs corresponding to the general formula

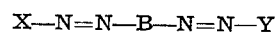

wherein B stands for a radicle selected from the class consisting of diphenyls being substituted in 2- and 2'-position with reference to the azo groups shown in 4- and 4'-position and diphenyls attached to the azo groups shown in 2- and 4'-position, and wherein X and Y stand for a 1-(ortho-hydroxy-carboxy-sulphophenyl)-3-methyl-5-pyrazolone.

5. The complex chromium compounds of disazo dyestuffs corresponding to the general formula

wherein B stands for a diphenyl radicle attached to the azo groups shown in 4- and 4'-position and being substituted in the 2- and 2'-positions, and wherein X and Y stand for a 1-(ortho-hydroxy-carboxy-sulphophenyl)-3-methyl-5-pyrazolone.

6. The complex chromium compound of the dyestuffs corresponding to the general formula

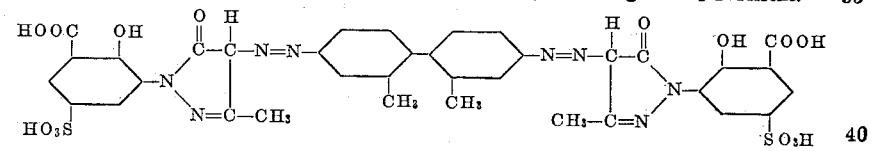

HANS KRZIKALLA.
HELMUT PFITZNER.